Jan. 9, 1951            E. COLE            2,537,572
PLATFORM LEVELING MECHANISM FOR TRUCK CHASSIS
Filed Aug. 15, 1946            6 Sheets-Sheet 6
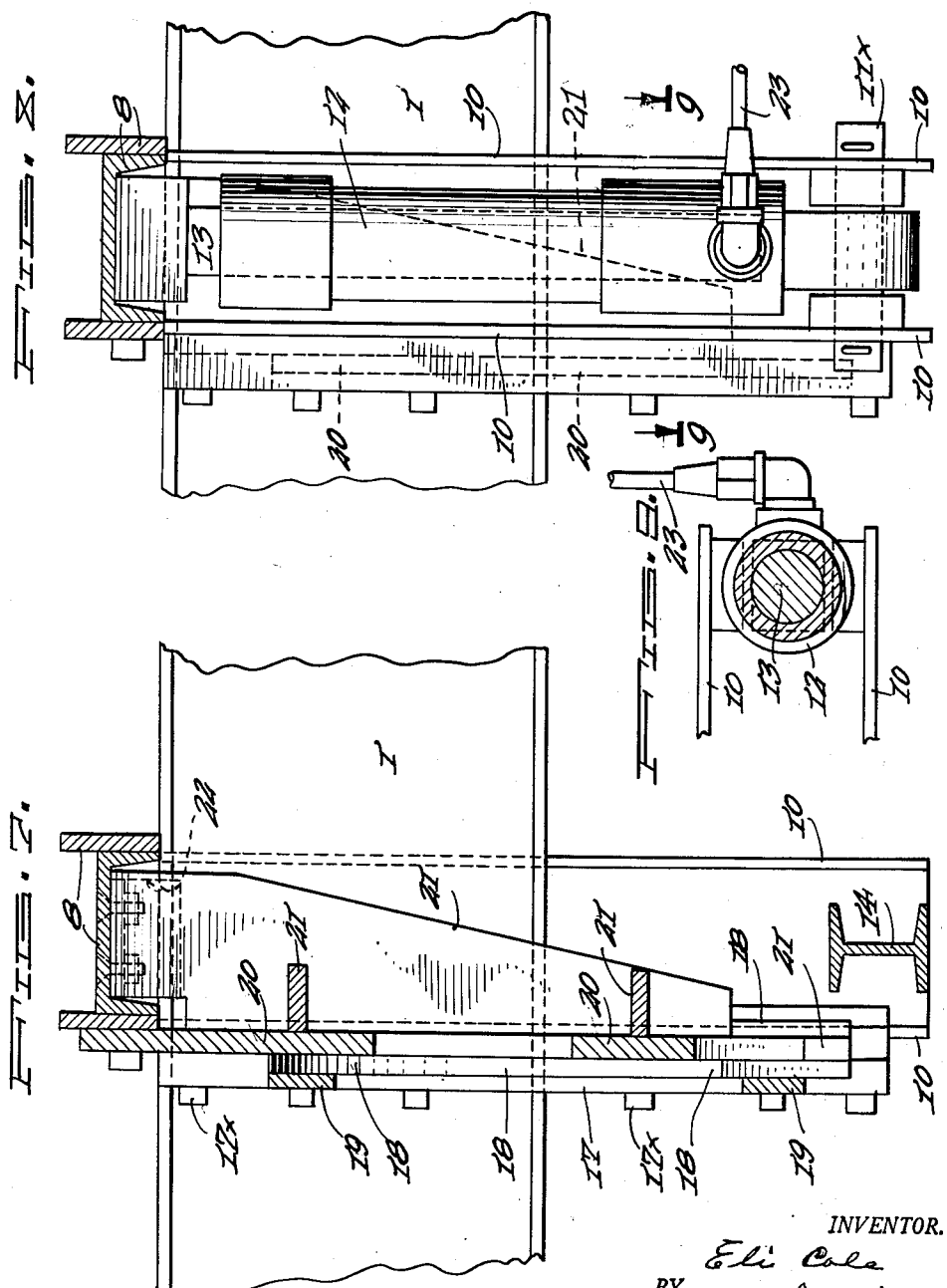
INVENTOR.
Eli Cole
BY
H. Lee Helms
ATTORNEY.

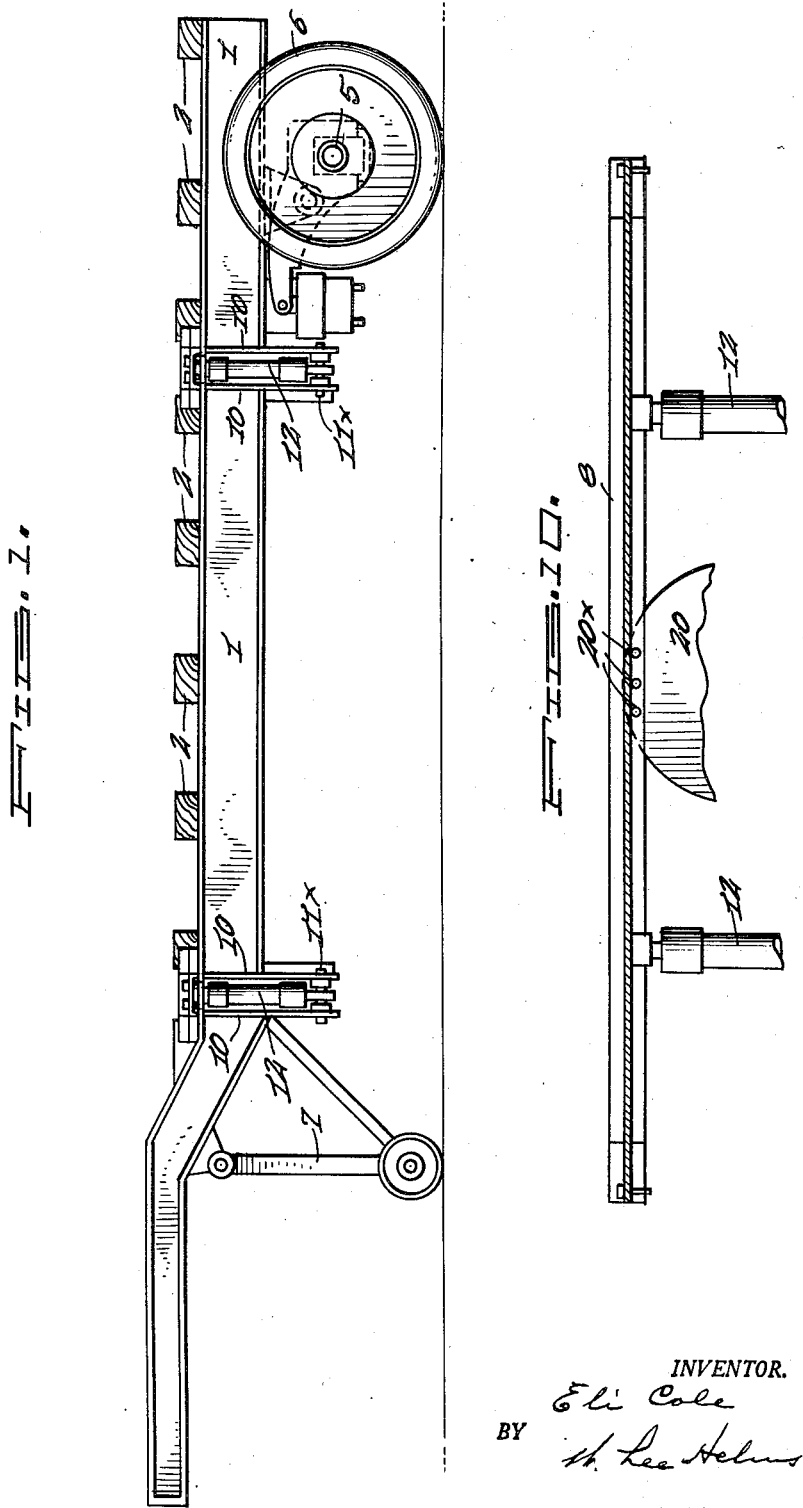

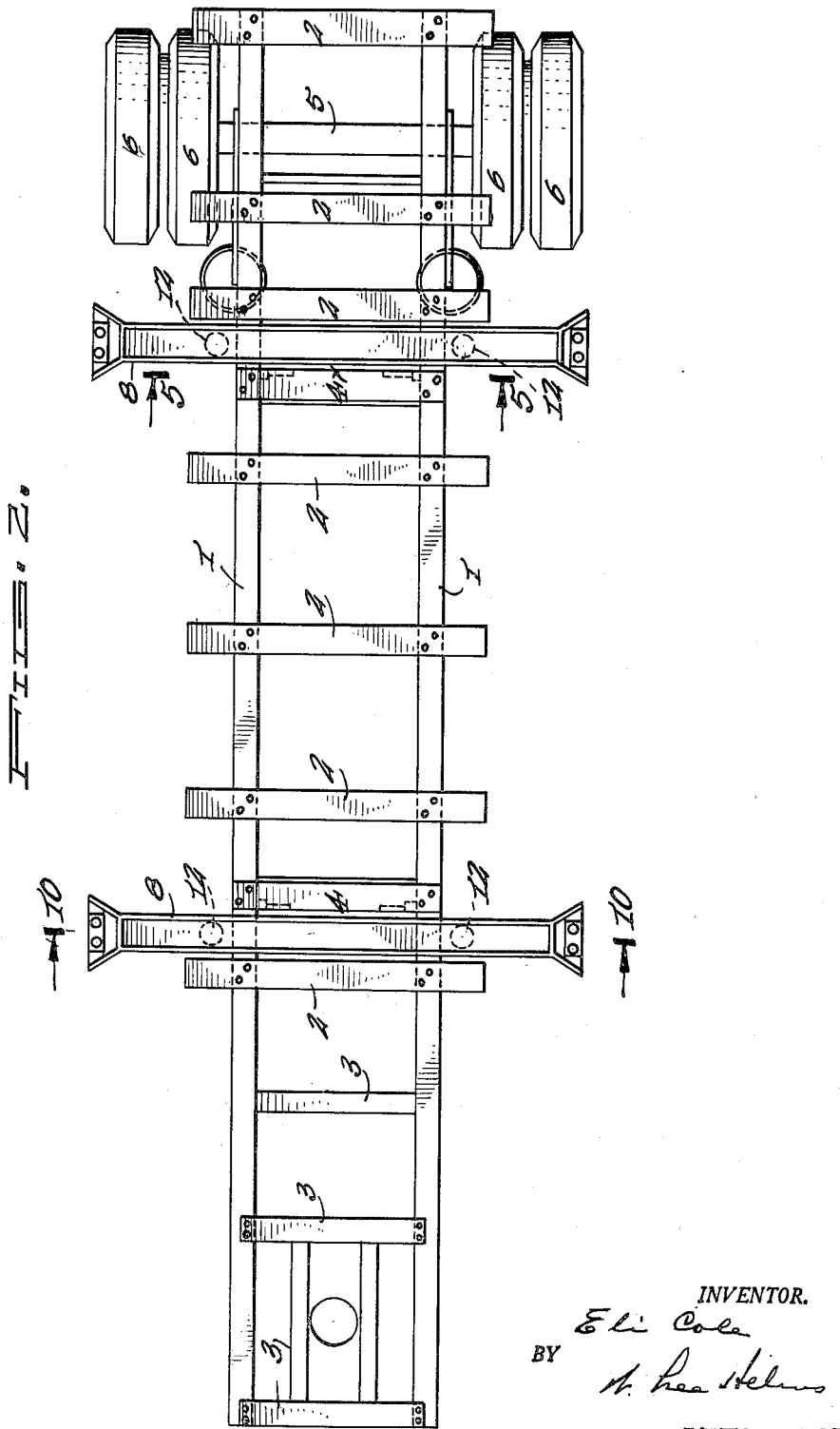

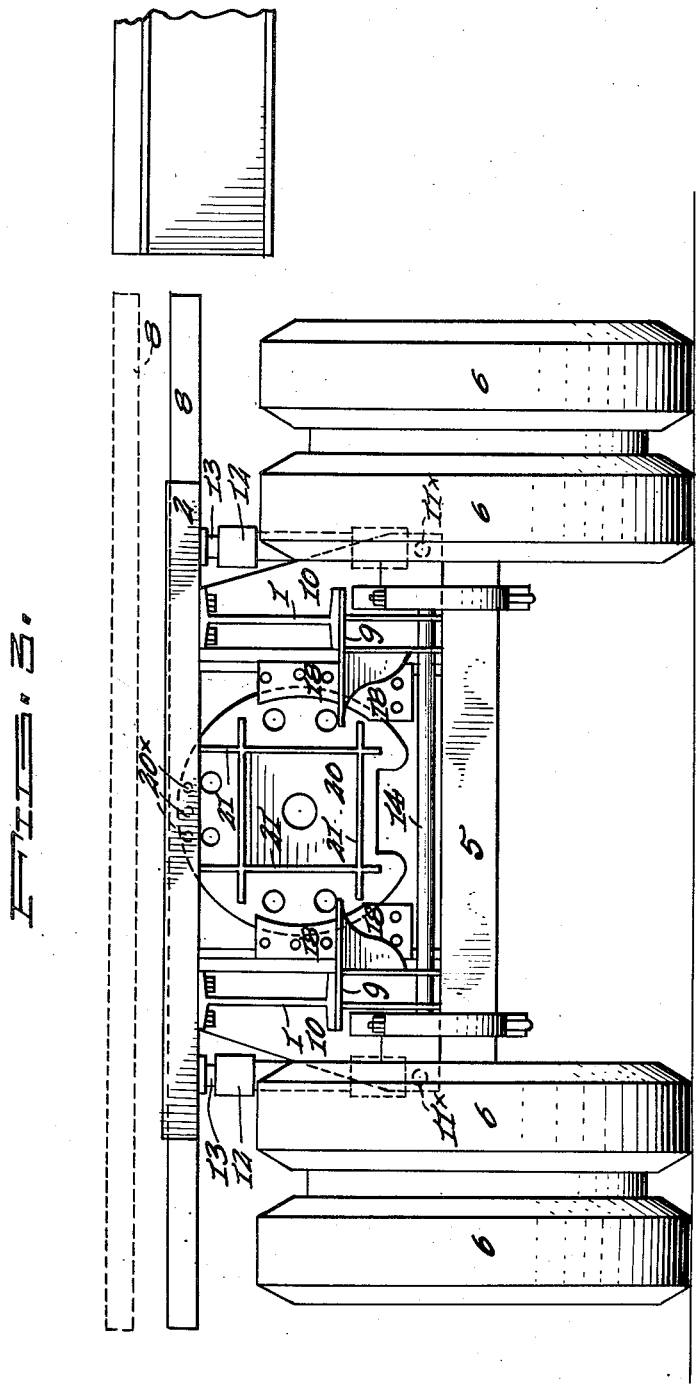

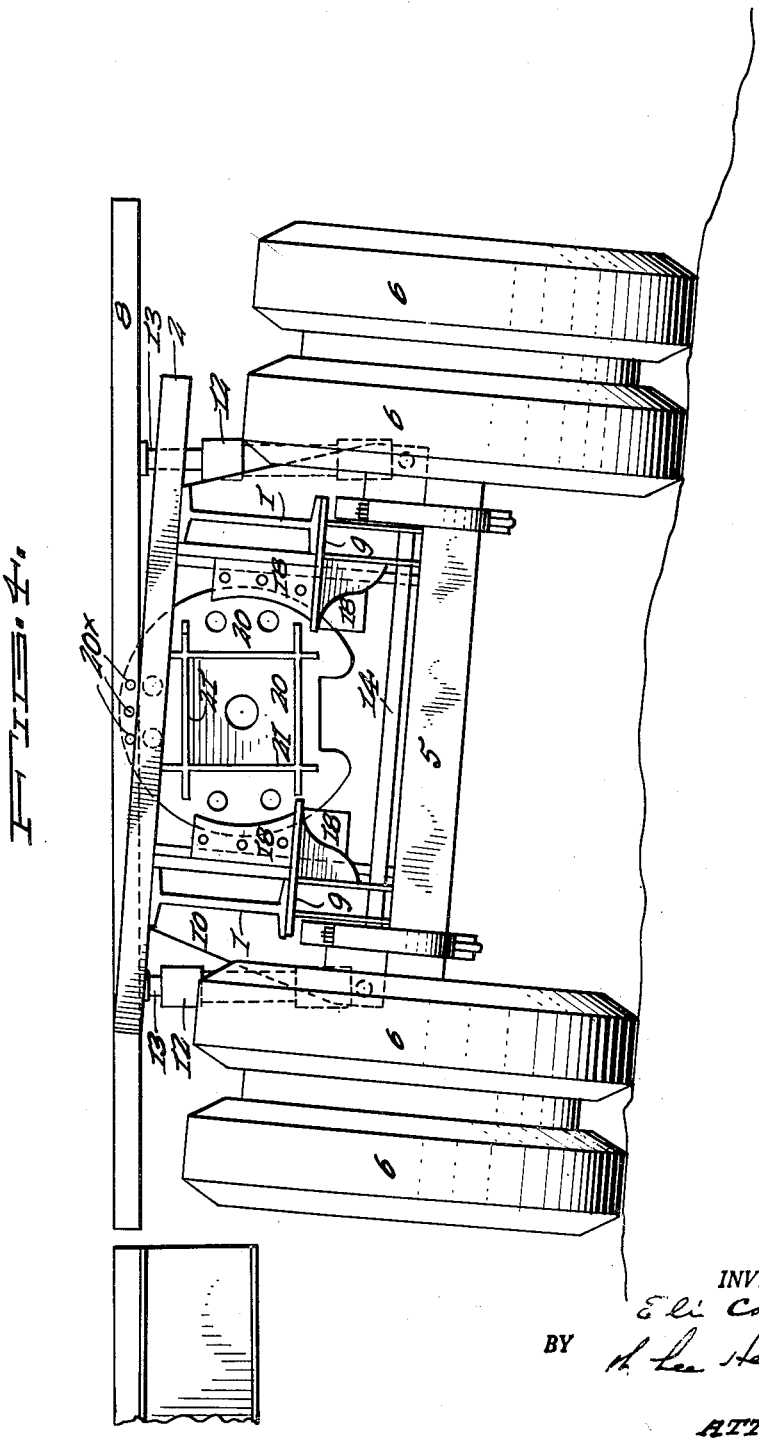

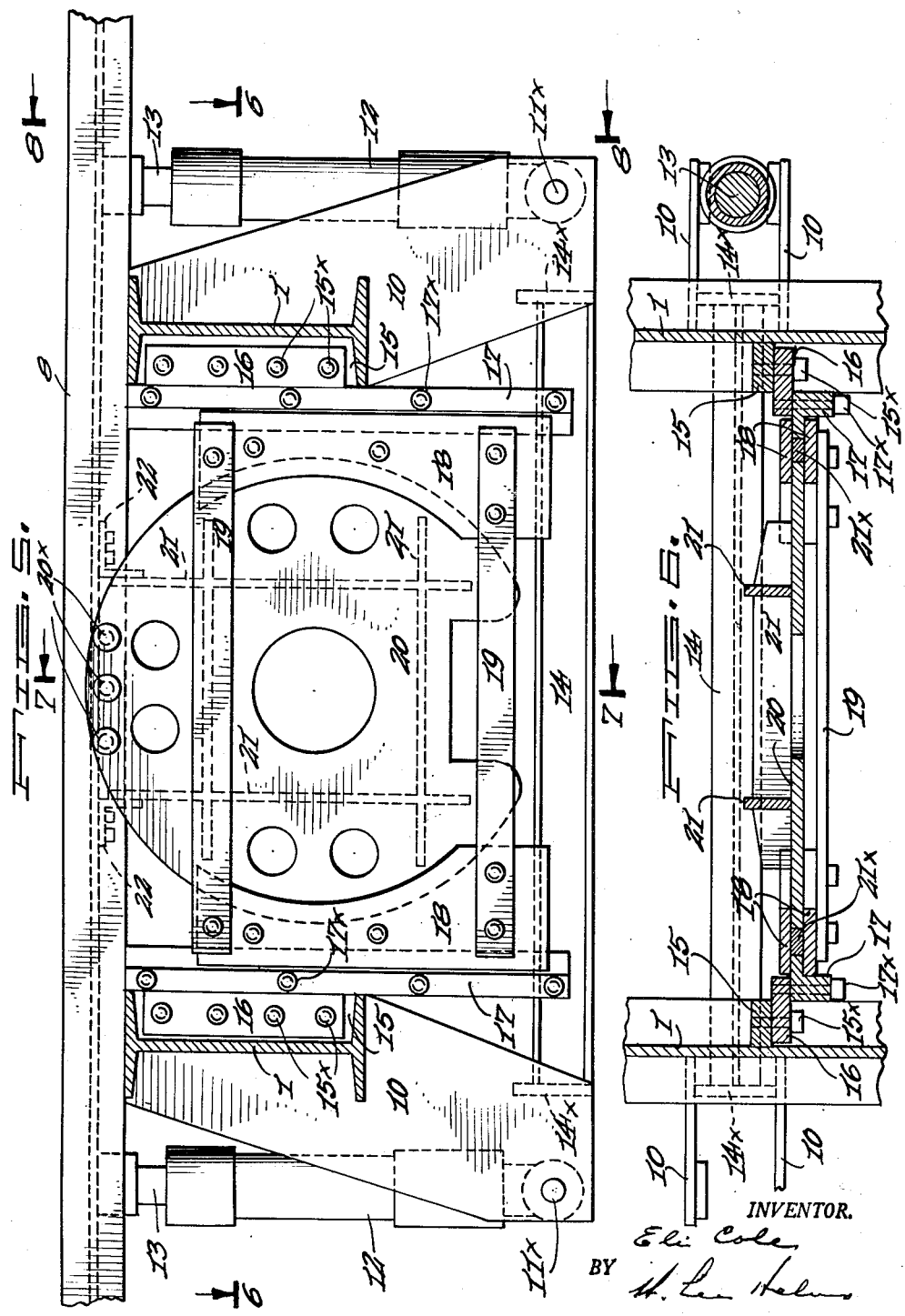

Patented Jan. 9, 1951

2,537,572

UNITED STATES PATENT OFFICE 2,537,572

PLATFORM LEVELING MECHANISM FOR TRUCK CHASSIS

Eli Cole, Louisville, Ky., assignor to Reynolds Metals Company, Richmond, Va., a corporation of Delaware Application August 15, 1946, Serial No. 690,656

2 Claims. (Cl. 280—6)

The present invention relates to wheeled carriers or trucks of that kind adapted for loading flat cars and the like with relatively heavy loads, and is particularly related to the carrying and loading of large containers which are moved upon flat cars, each container being less than a carload, but having substantial bulk and weight. Such less-than-carload containers frequently are provided with retractable wheels, so that at the time of loading the containers may be moved from the platform of the truck chassis directly to and on a flat car. By means of the present invention the truck may be moved alongside the flat car even when the latter is on trackballast and the wheels of the truck nearest the flat car are at a much higher level than the opposite set of wheels, so that the truck platform lies at an incline directed away from the flat car. In such case the truck platform may be levelled-off by a mechanism which insures adequate support of the platform throughout the lateral and vertical stresses which are imposed upon it by such levelling operation and heavy load.

The invention will be described with reference to the accompanying drawings, in which:

Fig. 1 is a side elevation showing an embodiment of the invention;

Fig. 2 is a plan view of the mechanism shown in Fig. 1;

Fig. 3 is a rear elevation showing the truck on level ground, the platform of a flat car being indicated fragmentarily, dotted lines showing an elevated position of the truck platform to bring it in line with the platform of the flat car;

Fig. 4 is a view similar to Fig. 3 showing the truck on an incline with the platform beams brought to a level with the platform of the flat car;

Fig. 5 is an enlarged vertical section taken on the line 5—5, Fig. 2;

Fig. 6 is a horizontal section on the line 6—6, Fig. 5;

Fig. 7 is a vertical section on the line 7—7, Fig. 5;

Fig. 8 is a fragmentary vertical section on the line 8—8, Fig. 5;

Fig. 9 is a horizontal section on the line 9—9, Fig. 8; and

Fig. 10 is a transverse section on the line 10—10, Fig. 2.

Referring to the drawings, I have shown in Fig. 1 a truck frame, adapted as a trailer. As shown in that figure and also in Fig. 2 the frame consists of the longitudinal frame members 1 connected by suitable transverse members 2, which in Fig. 1 are shown as heavy wood bars. The raised front end of the frame is further reinforced by metallic struts 3. Further reinforcing metallic members are shown at 4 and 4x. The axle of rear housing axle 5 carries wheels 6, and the raised front end is normally supported by the wheels of a retractable bracket generally indicated at 7.

At the top of the frame members 1 and adapted to be directly supported thereon are two heavy beams 8, which beams are adapted to directly carry a truck platform of any suitable construction. Longitudinal frame members 1 are carried by supports 9, and rise from the rear axle housing. Welded or otherwise secured to each frame member 1 are two sets of depending carrier plates 10. Each set of carrier plates 10 has pivoted thereto at 11x a hydraulic jack 12. The headed piston 13 of each jack is secured to the one of two beams 8. In practice each set of carrier plates may be joined and reinforced by a reinforcing transverse bar 14x which will project between the plates of each set (Fig. 6) and be secured thereto by welding through the intermediary of the head plates 14, Fig. 5.

The frame members 1 under each beam has welded thereto vertical bars 15 to which are bolted, by bolts 15x, plates 16, each of which carries an elongated guide bar 17 L-shaped in section (Figs. 5 and 6) and held by bolts 17x. Each guide bar has the function of a slideway member. Each guide bar is embraced by spaced slide plates 18, the opposite sets of slide plates 18 being connected by bars 19. Each of the two sets of slide plates 18 receives between them a stress-resisting member in the form of a disk 20, the edge of the disk within each set of slide plates abutting a curved spacer 21x, Fig. 6.

Disk 20 is bolted to the said rearmost transverse beam 8 by bolts 20x. Thus, should the four jacks 12 be raised simultaneously said disk 20 will have corresponding movement, and will carry with it the slide plates 18. Also, should the jacks 12 at one side only of the structure be raised, the tilting of the beams 8 will cause a rotational movement of both disks 20. In practice each disk 20 will be reinforced by webs 21 which will afford additional means of attachment of the disk to said beam 8, as by the brackets 22 indicated in Fig. 5.

It will be understood that the jacks 12 will be provided with a source of fluid under pressure, with an intermediate valve control (not shown) whereby the jacks may be operated uniformly and simultaneously to raise the beams to the position of the dotted lines in Fig. 3 and also the jacks at each side of the truck may be operated simultaneously to cause the beams to be tilted relatively to the chassis for leveling off of the truck platform, as shown in Fig. 4. Such pressure source and valve control form no part of the present invention and have not been illustrated herein. A pressure line at one of the jacks 12 is indicated in Figs. 8 and 9 at 23.

It will be understood that various modifications may be made in the form and arrangement of the elements illustrated in the drawing as constituting an embodiment of the invention, without departing from the spirit of the invention.

Having described my invention, what I claim and desire to secure by Letters Patent is as follows:

1. In a platform leveling mechanism for truck chassis and the like, in combination with a chassis frame, of two platform supports upon said frame and extending transversely of the latter, two jacks carried by the chassis frame at each side thereof, and each jack being connected to one of the platform supports, so that the jacks at one side of the chassis frame may be actuated to tilt the platform supports toward the opposite side of the chassis frame, two stress-resisting assemblies, disposed at opposite sides of the longitudinal center of the chassis frame, and each assembly being disposed adjacent one of the platform supports and extending transversely of the chassis frame, each stress-resisting assembly consisting of a slideway carried by the chassis frame, opposed slides guided by said slideway for up and down movement, and a stress-resisting member secured to the appropriate platform support and received and guided for rotation by and relatively to the opposed slides, said stress-resisting members being adapted for raising and lowering the slides in accordance with up and down movements of the platform supports secured to said stress-resisting members.

2. In a platform leveling mechanism for truck chassis and the like, in combination with a chassis frame, including parallel longitudinal beams, jacks pivotally connected at their lower ends to said beams and projecting upward from their pivotal connections, two jacks being at each side of said chassis frame, two platform supports each at one side of the longitudinal center of the chassis frame and extending transversely of the latter and overlying two of those jacks which are disposed in transverse registration at opposite sides of the chassis frame, means for leading hydraulic pressure to said jacks, two stress-resisting assemblies each adjacent one of the platform supports and each assembly consisting of a slideway carried by the chassis frame, a pair of slides for each slideway, each slide having an inner curvi-linear guiding surface, a stress-resisting member rigidly connected to said platform support and received in each one of the pair of slides, said stress-resisting member being formed with curved surfaces adapted for registration with like surfaces of the slides, as and for the purpose set forth.

ELI COLE.

REFERENCES CITED

The following references are of record in the file of this patent:

UNITED STATES PATENTS

| Number | Name | Date |
|---|---|---|
| 516,785 | Bennett | Mar. 20, 1894 |
| 696,535 | Bailey | Apr. 1, 1902 |
| 987,660 | Wood | Mar. 21, 1911 |
| 2,306,284 | Shonnard | Dec. 22, 1942 |
| 2,359,961 | Anthony | Oct. 10, 1944 |
| 2,365,387 | Briscoe | Dec. 19, 1944 |